(12) United States Patent
Kamegawa et al.

(10) Patent No.: US 9,321,649 B2
(45) Date of Patent: *Apr. 26, 2016

(54) CARBON MICROPARTICLE HAVING LIGNIN AS RAW MATERIAL AND PREPARATION METHOD THEREFOR

(75) Inventors: Katsumi Kamegawa, Tosu (JP); Tsuyoshi Sakaki, Tosu (JP); Kinya Sakanishi, Kure (JP); Masaya Kodama, Tsukuba (JP); Keiko Nishikubo, Tosu (JP); Yoshio Adachi, Tosu (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 13/536,053

(22) Filed: Jun. 28, 2012

(65) Prior Publication Data

US 2012/0269715 A1 Oct. 25, 2012

Related U.S. Application Data

(62) Division of application No. 12/745,148, filed as application No. PCT/JP2008/070961 on Nov. 18, 2008, now abandoned.

(30) Foreign Application Priority Data

Dec. 3, 2007 (JP) .................................. 2007-311918
Jul. 17, 2008 (JP) .................................. 2008-186135

(51) Int. Cl.
C01B 31/02 (2006.01)

(52) U.S. Cl.
CPC ............. *C01B 31/02* (2013.01); *C01P 2004/32* (2013.01); *Y10T 428/2982* (2015.01)

(58) Field of Classification Search
CPC ............................. C01B 31/02; C01P 2004/32
USPC ...................................................... 423/445 R
See application file for complete search history.

(56) References Cited

U.S. PATENT DOCUMENTS

| 3,775,344 | A |   | 11/1973 | Amagi et al. |        |
|-----------|---|---|---------|--------------|--------|
| 3,886,093 | A | * | 5/1975  | Dimitri      | 502/406|
| 4,768,469 | A |   | 9/1988  | Iizuka et al.|        |
| 4,782,097 | A | * | 11/1988 | Jain et al.  | 521/56 |
| 5,492,870 | A |   | 2/1996  | Wilcox et al.|        |
| 5,849,055 | A |   | 12/1998 | Arai et al.  |        |
| 5,972,537 | A | * | 10/1999 | Mao et al.   | 429/231.8 |
| 2008/0027149 | A1 |   | 1/2008 | Aikyou et al. | |
| 2011/0281113 | A1 |   | 11/2011 | Kamegawa et al. | |

FOREIGN PATENT DOCUMENTS

| JP | 03-164416   | A  | 7/1991 |
|----|-------------|----|--------|
| JP | 07-187849   | A  | 7/1995 |
| JP | 07-267618   | A  | 10/1995 |
| JP | 11-268907   | A  | 10/1999 |
| JP | 2001-220114 | A  | 8/2001 |
| JP | 2002-241116 | A  | 8/2002 |
| JP | 2002-344194 | A  | 11/2002 |
| JP | 2004-526652 | A  | 9/2004 |
| JP | 2005-053745 | A  | 3/2005 |
| JP | 2005-281065 | A  | 10/2005 |
| JP | 2005-289666 | A  | 10/2005 |
| JP | 2006-075708 | A  | 3/2006 |
| JP | 2007-001810 | A  | 1/2007 |
| JP | 2007-254243 | A  | 10/2007 |
| JP | 2009-155199 | A  | 7/2009 |
| WO | 2006/046656 | A1 | 5/2006 |

OTHER PUBLICATIONS

International Search Report of PCT/JP2008/070961, mailing date of Jan. 20, 2009.
Hou et al., "Carbon Nanotubes and Spheres Produced by Modified Ferrocene Pyrolysis", Chem. Mater. 2002, 14, 3990-3994.
Paunov et al., Fabrication of Carbon Nanotube-Based Microcapsules by a Colloid Templating Technique, Nanotechnology 16, 2005, 1522-1525.
Machine Translation of JP07-267618.
International Search Report of PCT/JP2009/006801, mailing date of Mar. 16, 2010.
Extended European Search Report dated Oct. 9, 2013, issued in related European Application No. 08857453.8 (12 pages).
Related U.S. Appl. No. 13/145,051, filed Jul. 18, 2011, published as 2011/0281113 A1 on Nov. 17, 2011.

* cited by examiner

*Primary Examiner* — Stuart Hendrickson
(74) *Attorney, Agent, or Firm* — Westerman, Hattori, Daniels & Adrian, LLP (57) ABSTRACT

A method for preparing a carbon microparticle from an organic raw material having lignin as a main constituent, wherein an aqueous solution with 5% total concentration of lignin and sodium hydroxide (the proportion in mass is 1:0.5) is spray-dried to prepare a complex microparticle. This complex microparticle is heat-processed under nitrogen atmosphere at 600° C. for one hour and cooled. Thereafter, this is washed with water and further dried to prepare a hollow carbon microparticle such as those shown in FIG. 2 (*b*). The prepared carbon microparticle is light-weight and has an equivalent specific surface area to commercially available activated charcoal.

11 Claims, 4 Drawing Sheets

CARBON MICROPARTICLE HAVING LIGNIN AS RAW MATERIAL AND PREPARATION METHOD THEREFOR

This application is a divisional application of U.S. patent application Ser. No. 12/745,148 filed May 27, 2010, which is based on and claims priority from Japanese Patent Application No. 2007-311918 filed on Dec. 3, 2007 and Japanese Patent Application No. 2008-186135 filed on Jul. 17, 2008, the entire contents of which being incorporated herein by reference.

TECHNICAL FIELD

The present invention relates to a method for preparing a carbon microparticle. More particularly, it relates to a method for preparing a carbon microparticle from various organic raw materials having lignin as main constituent, and to carbon microparticles obtained thereby.

BACKGROUND ART

In recent years, as global warming and soaring of oil price have become problems at a global scale, transition from fossil resources to biological resources is being hurried. Meanwhile, on the order of 10,000,000 tons per year of prior art carbon microparticles, of which carbon black is a representative, are manufactured globally as tire reinforcing agents or the like, and these are conventionally manufactured by thermal decomposition of fossil resources such as oil and such at high temperatures of on the order of 1400° C.

Here, thermal decomposition of a spherical organic macromolecule containing lignin as shown in Patent Reference 1, grinding of a thermosetting resin carbon as shown in Patent Reference 2, thermal decomposition of a thermoplastic resin microparticles having activated charcoal powder attached on the surface as shown in Patent Reference 3, deposition of non-graphite structure hollow micro-carbon vaporized by thermal plasma as shown in Patent Reference 4, carbonization of microparticular thermosetting resin prepared by suspension polymerization as shown in Patent Reference 5, grinding of a carbon material in a solvent as shown in Patent Reference 6, laser illumination of a hydrocarbon compound particle as shown in Patent Reference 7, heat treatment of specially shaped carbon black at 2000° C. or higher as shown in Patent Reference 8, thermal decomposition of a synthetic resin by arc-discharge as shown in Patent Reference 9, spray pyrolysis of carbohydrates from biomass acid decomposition products as shown in Patent Reference 10, preparation by a piezo-vibrating nebulizer granulating apparatus with a thermosetting resin as a raw material as shown in Patent Reference 11, and the like, exist as other preparation methods for carbon microparticles. Furthermore, Non-Patent References 1 to 4 are reported as scientific articles related to hollow carbon microparticles.

[Patent Reference 1] Japanese Patent Application Laid-open No. H01-207719
[Patent Reference 2] Japanese Patent Application Laid-open No. H03-164416
[Patent Reference 3] Japanese Patent Application Laid-open No. H07-187849
[Patent Reference 4] Japanese Patent Application Laid-open No. H07-267618
[Patent Reference 5] Japanese Patent Application Laid-open No. 2001-220114
[Patent Reference 6] Japanese Patent Application Laid-open No. 2002-241116
[Patent Reference 7] Japanese Patent Application Laid-open No. 2004-526652
[Patent Reference 8] Japanese Patent Application Laid-open No. 2005-281065
[Patent Reference 9] Japanese Patent Application Laid-open No. 2005-53745
[Patent Reference 10] Japanese Patent Application Laid-open No. 2005-289666
[Patent Reference 11] Japanese Patent Application Laid-open No. 2006-75708
[Non-patent Reference 1] Journal of Colloid and Interface Science, Vol. 177, 325-328 (1996)
[Non-patent Reference 2] Advanced Materials, Vol. 14, 1390-1393 (2002)
[Non-patent Reference 3] Chemistry of Materials, Vol. 15, 2109-2111 (2003)
[Non-patent Reference 4] Microporous and Mesoporous Materials, Vol. 63, 1-9 (2003)

However, no preparation technique for carbon microparticle has been established from raw materials having lignin as a main constituent. In Patent Reference 1, lignin is cited as no more than an example of raw materials for a spacer between facing substrates in a liquid crystal display device, and in order to conform to this application, it suffices that the microparticles are spherical and the particle diameter is on the order of few μm to tens of μm. However, in cases such as when the microparticles are used as filling materials, adsorption materials and the like, the characteristics of the microparticles needed depending on the application are different. In particular, many cases require light weight, high strength, high specific surface area and the like, and the establishment of a technique for preparing a carbon microparticle provided with the desired characteristics is much expected in the present technical field. As lignin is present in large quantities in nature, particularly in wood, if preparing carbon microparticles becomes possible from raw materials containing lignin, it will result in a large contribution in the transition from fossil resources to biological resources. Moreover, biomasses containing lignin such as pulp waste liquid and waste wood, which are discarded from pulp manufacturing processes, and waste from agricultural products, are discarded in large amounts, with their treatment requiring large costs and being also technically difficult.

DISCLOSURE OF THE INVENTION

The present invention was devised in view of such issues, and an object thereof is to provide a method for preparing a carbon microparticle from an organic raw material having lignin as a main constituent, and in particular, to provide a preparation method for a carbon microparticle having high strength, light weight and high specific surface area. It is another object of the present invention to provide a method for preparing a carbon microparticle from organic raw materials having lignin as a main constituent which saves energy.

In order to solve the above issues, the present invention adopts the following means.

The carbon microparticle preparation method according to the present invention 1 is characterized in that a solution of organic raw material having lignin as a main constituent is turned into a micro-droplet, the micro-droplet is dried to prepare a microparticle, and the microparticle is thermally decomposed in a range of 300° C. to 1200° C. to prepare a carbon microparticle.

The carbon microparticle preparation method according to the present invention 2 is characterized in that a mixed solution of an organic raw material having lignin as a main constituent and an inorganic substance is turned into a microdroplet, the micro-droplet is dried to prepare a microparticle, and the microparticle is thermally decomposed in a range of 300° C. to 1200° C. to prepare a carbon microparticle.

The carbon microparticle preparation method according to the present invention 3 is characterized in that, in the carbon microparticle preparation method described in the present invention 2, the inorganic substance is a metal compound constituted by one or more species selected from the group consisting of an oxide, a hydroxide, a carbonate and a halide of a metal, and, based on the property that a carbon wall thickness of the carbon microparticle (portion of the shell that forms a hollow carbon microparticle) becomes thinner as the proportion of the metal compound added increases, the proportion of the metal compound added is adjusted to control the carbon wall thickness of the microparticle.

The carbon microparticle preparation method according to the present invention 4 is characterized in that, in the carbon microparticle preparation method described in the present invention 2, prior to being taken out into the air, the carbon microparticle obtained during the thermal decomposition or after the thermal decomposition is brought into contact beforehand with a gas having low reactivity, thereby inactivating the surface of the carbon microparticle by reaction with the gas and inhibiting a rapid heat generation occurring when the carbon microparticle is taken out into the air.

The carbon microparticle preparation method according to the present invention 5 is characterized in that a mixed solution of organic raw materials having lignin as a main constituent and a basic compound is turned into a micro-droplet, the micro-droplet is dried to prepare a microparticle, and the microparticle is thermally decomposed in a range of 300° C. to 1200° C. and the specific surface area is increased to prepare a carbon microparticle. This specific surface area is approximately 900 $m^2/g$ or greater.

The carbon microparticle preparation method according to the present invention 6 is characterized in that preprocessing to raise the constituent ratio of lignin is carried out on a pulp waste solution, the pulp waste solution after the preprocessing is turned into a micro-droplet, the micro-droplet is dried to prepare a microparticle, and the microparticle is thermally decomposed in a range of 300° C. to 1200° C. to prepare a carbon microparticle.

The carbon microparticle preparation method according to the present invention 7 is characterized in that preprocessing to raise the constituent ratio of lignin is carried out on a pulp waste solution, a solution comprising the pulp waste solution after the preprocessing added with an inorganic substance is turned into a micro-droplet, the micro-droplet is dried to prepare a microparticle, and the microparticle is thermally decomposed in a range of 300° C. to 1200° C. to prepare a carbon microparticle.

The carbon microparticle preparation method according to the present invention 8 is the carbon microparticle preparation method described in the present invention 6 or 7, characterized in that separation-collection of high molecular weight lignin is carried out by ultrafiltration as the preprocessing.

The carbon microparticle preparation method according to the present invention 9 is the carbon microparticle preparation method described in the present invention 6 or 7, characterized in that a process is carried out as the preprocessing, in which carbon dioxide is absorbed by the pulp waste solution to thereby decrease a hydrogen ion index and deposit a portion of an organic constituent, and the organic constituent is separated.

The carbon microparticle according to the present invention 10 is a hollow carbon microparticle characterized in that it is obtained by turning a solution of lignin, or lignin and an inorganic substance into a micro-droplet, drying the micro-droplet to prepare a microparticle, and thermally decomposing the microparticle in a range of 300° C. to 1200° C.

The carbon microparticle according to the present invention 11 is a hollow carbon microcell, characterized in that it is obtained by turning a solution of lignin, or lignin and a basic compound into a micro-droplet, drying the micro-droplet to prepare a microparticle, and thermally decomposing the microparticle in a range of 300° C. to 1200° C., and in that it has an external diameter of 0.2 to 50 µm and a carbon wall thickness of 0.05 to 20 µm.

The carbon microparticle according to the present invention 12 is the hollow carbon microcell described in the present invention 11, characterized in that the proportion in mass of the lignin and the basic compound is 1:0.5 to 1:2, and the carbon microparticle is hollow and has a high specific surface area. From the fact that the carbon wall becomes thin when the proportion in mass of the basic compound is larger, the carbon wall thickness can be controlled by adjusting the proportion in mass thereof within the range given above. Then, the specific surface area increases remarkably along with increasing proportion in mass of the basic compound. However, when the basic compound was added with a proportion that exceeded 1:2, melting of microparticles was triggered.

The carbon microparticle according to the present invention 13 is a hollow carbon microballoon characterized in that it is obtained by turning a solution of lignin as well as a metal compound constituted by one or more species selected from the group consisting of an oxide, a hydroxide, a carbonate and a halide of a metal into a micro-droplet, drying the micro-droplet to prepare a microparticle, and thermally decomposing the microparticle in a range of 300° C. to 1200° C., and in that it has an external diameter of 0.2 to 50 µm, a carbon wall thickness of 5 to 200 nm and a bulk density of 3 to 20 g/L.

The carbon microparticle according to the present invention 14 is the carbon microballoon described in the present invention 13, characterized in that the proportion in mass of the lignin and the metal compound is 1:3 to 1:20. From the fact that the carbon wall becomes thin when the proportion in mass of the metal compound is larger, the carbon wall thickness can be controlled by adjusting the proportion in mass thereof within the range given above. However, when the metal compound was added with a proportion of less than 1:3, no carbon microballoon was generated, and when added with a proportion exceeding 1:20, the microballoons broke up without becoming hollow, and only aggregated products could be obtained.

The carbon microparticle according to the present invention 15 is a hollow carbon nanopipe cell characterized in that it is a hollow carbon microparticle obtained by turning a solution of lignin and metasilicate into a micro-droplet, drying the micro-droplet to prepare a microparticle, and thermally decomposing the microparticle in a range of 300° C. to 1200° C., and in that it has an external diameter of 0.2 to 50 µm and a carbon wall thickness of 0.05 to 20 µm, and furthermore, the carbon wall thereof is constituted by a carbon nanopipe having an external diameter of 5 to 50 nm and a carbon wall thickness of 1 to 5 nm.

The carbon microparticle according to the present invention 16 is the carbon nanopipe cell described in the present invention 15, characterized in that the proportion in mass of the lignin and the metasilicate is 1:3 to 1:20. From the fact that the carbon wall becomes thin when the proportion in mass of metasilicate is increased, the carbon wall thickness can be controlled by adjusting the proportion in mass thereof within the range given above. However, when metasilicate was added with a proportion of less than 1:3 or exceeding 1:20, no carbon nanopipe cell was generated.

The carbon microparticle according to the present invention 17 is a hollow, non-graphite carbon nanocell, characterized in that it is obtained by turning a solution of lignin and orthosilicate into a micro-droplet, drying the micro-droplet to prepare a microparticle, and thermally decomposing the microparticle in a range of 300° C. to 1200° C., and in that it has an external diameter of 3 to 30 nm, a carbon wall thickness of 1 to 5 nm and a specific surface area of 1400 to 1600 $m^2/g$.

The carbon microparticle according to the present invention 18 is the carbon nanocell described in the present invention 17, characterized in that the proportion in mass of the lignin and the orthosilicate is 1:5 to 1:20. From the fact that the carbon wall becomes thin when the proportion in mass of orthosilicate is increased, the carbon wall thickness can be controlled by adjusting the proportion in mass thereof within the range given above. However, when orthosilicate was added with a proportion of less than 1:5 or exceeding 1:20, no carbon nanocell was generated.

Hereafter, each element constituting the present invention will be described concretely.

[Organic Raw Materials]

As referred to in the present invention, organic raw materials having lignin as a main constituent include, in addition to lignin, organic compounds in waste solutions discarded in the manufacturing process of paper pulp or waste solutions from the preprocessing thereof, and further, those from the preprocessing of plant raw materials containing lignin such as wood and plants. Lignin is, for instance, a high molecular weight aromatic polymer compound present for instance in wood at 20 to 30 mass %, constituting the intermediate layer between a cell membranes, a portion being considered to be present in a cell membrane. A variety of methods are known for separating lignin from a plant body, and these methods are used. Concretely, lignin as referred to in the present invention means alkaline lignin, hydrolyzed lignin, lignin sulfonic acid and the like.

[Preprocessing]

As referred to in the present invention, preprocessing refers to a process for raising the constituent ratio of lignin from [that in] an organic raw material containing lignin, or a process for improving lignin into a structure suitable for the preparation of carbon microparticles. That is to say, it is a process prior to turning an organic raw material containing lignin into a micro-droplet. For instance, when a pulp waste solution is used as an organic raw material, although it is not necessarily a mandatory process, it is desirable to perform preprocessing for raising the constituent proportion of lignin. Concretely, processes such as (1) absorption of acidic gas to precipitate and separate lignin; (2) addition of an inorganic acid, a multivalent cation or an organic amine to precipitate and separate lignin; (3) fermentation and removal by degradation of sugars in the pulp waste solution; and (4) separation and collection of high molecular weight lignin by ultrafiltration can be considered. Filtration is a general method for separating water and lignin with a filter. The ultrafiltration membranes used in the present invention refer to porous membranes with pore diameters ranging from 1 nm to 100 nm (0.1 μm).

In addition, for preprocessing when using wood, plants and the like as organic raw materials, for instance, well known methods such as alkaline decomposition used in pulp manufacturing or the like can be used. In addition, the constituent ratio of lignin can be raised by using the lignin separation-concentration method described above, or the like, as necessary.

[Thermal Decomposition]

As referred to in the present invention, thermal decomposition refers to heating and carbonizing an organic raw materials containing lignin at 300° C. to 1200° C. In general, thermal decomposition is performed at 500° C. to 800° C.

[Inorganic Substance]

The inorganic substances used in the present invention are used to control various characteristics such as carbon wall thickness of carbon microparticle, thermoplasticity of lignin, pore structure of carbon wall and conductivity of carbon microparticle. As referred to in the present invention, inorganic substances include, in addition to single body carbons, water soluble salts such as an oxide, a hydroxide, a carbonate, a halide, a sulfate, a nitrate, a silicate, a phosphate and a borate of a metal, as well as these microparticles thereof and micro-fibers thereof.

[Inactivation]

As referred to in the present invention, inactivation refers to bringing a carbon microparticle obtained during thermal decomposition or after thermal decomposition into contact with a gas having low reactivity to inactivate the surface of the carbon microparticle. This inactivation allows the rapid heat generation occurring when the carbon microparticle is taken out to be suppressed. Gas with low reactivity means water vapor gas, nitrogen gas containing low concentration of oxygen, and the like. Then, since generation of a gentle reaction with the carbon microparticle surface is required, totally inactive gas such as pure nitrogen is not applicable.

[Turning into Micro-Droplet]

As referred to in the present invention, turning into a micro-droplet refers to turning for instance a pulp waste solution after preprocessing into micro-droplets with diameters on the order of few tens of μm or less by methods such as spraying and ultrasonic nebulization.

[Carbon Microparticle]

As referred to in the present invention, a carbon microparticle refers to a particle comprising thermally decomposed or carbonized lignin in the organic compound. Carbon microparticles have various sizes (diameters on the order of few nm to 50 μm) and morphologies. In addition, it is characterized by a bulk density of 3 to 300 g/L, and a light weight.

According to the carbon microparticle preparation method of the present invention, carbon microparticles can be prepared from a solution of organic raw materials having lignin as a main constituent, which is a regenerable biological resource. This contributes greatly in the transition from fossil resources to biological resources for preparing carbon microparticles. In addition, various characteristics of the carbon microparticle such as carbon wall thickness can be controlled simply by adjusting the proportions of the added inorganic substances. Furthermore, by bringing the carbon microparticle obtained by thermal decomposition into contact with a gas having low reactivity, the rapid heat generation occurring when [the particle is] taken out into the air can be suppressed.

The carbon microparticle preparation method of the present invention allows a carbon microparticle to be prepared also from a mixed solution of organic raw materials having lignin as a main constituent and a basic compound, and a carbon microparticle obtained thereby is suited to a variety of applications as the specific surface area is equivalent to commercially available activated charcoal. From the fact that it is hollow, the carbon microparticle obtained by the preparation method of the present invention has the property of being extremely light in volume ratio compared to a conventional carbon microparticle, which is filled with carbon or the like all the way inside. Consequently, it is suited in particular to applications that require light weight. The carbon microparticle preparation method of the present invention allows carbon microparticles to be prepared also from pulp waste solutions, and pulp waste solutions can be used actively as biomass resources to prepare carbon microparticles. Furthermore, since the carbon microparticle preparation method of the present invention allows carbon microparticles to be prepared at lower heat treatment temperature than prior art, it also contributes to energy saving.

BRIEF DESCRIPTION OF THE DRAWINGS

FIG. 1 (a) is a photograph of hollow carbon microparticles prepared from lignin sulfonic acid only, and FIG. 1 (b) is a magnified photograph of a fracture cross section of a hollow carbon microparticle thereof;

FIG. 2 (a) is a magnified photograph of a fracture cross section of a carbon microparticle when the proportion in mass of lignin and sodium hydroxide is 1:0.25, FIG. 2 (b) is a magnified photograph of a fracture cross section of a carbon microparticle when the proportion in mass of lignin and sodium hydroxide is 1:0.5, and FIG. 2 (c) is a magnified photograph of a fracture cross section of a carbon microparticle when the proportion in mass of lignin and sodium hydroxide is 1:1;

FIG. 3 (a) is a photograph of hollow carbon microparticles prepared from lignin, sodium hydroxide and sodium chloride (proportion in mass=1:0.25:3), and FIG. 3 (b) magnified photograph of the fracture cross section of a hollow carbon microparticle thereof;

FIG. 4 (a) is a low magnification photograph of carbon nanoparticles prepared from lignin, sodium hydroxide and sodium metasilicate (proportion in mass=1:0.25:10), and FIG. 4 (b) is a high magnification photograph of a carbon nanoparticle thereof;

FIG. 5 (a) is a photograph of carbon prepared from a pulp waste solution which has not been preprocessed, FIG. 5 (b) is a photograph of carbon microparticles when ultrafiltration processing was performed on a pulp waste solution and high molecular weight constituents served as raw materials, and FIG. 5 (c) is a magnified photograph of a fracture cross section of a carbon microparticle thereof;

FIG. 6 (a) is a photograph of carbon microcells prepared by ultrasonic nebulization and FIG. 6 (b) is a magnified photograph of a carbon wall portion in the fracture cross section of a carbon microcell thereof;

FIG. 8 (a) is a photograph of a carbon nanopipe cell and FIG. 8 (b) is a magnified photograph of a carbon wall portion in the fracture cross section of a carbon nanopipe cell thereof.

BEST MODE FOR CARRYING OUT THE INVENTION

In the present invention, first, an organic raw material having lignin as a main constituent, which is a biological resource, or a solution of a mixture of this organic raw material and an inorganic substance is turned into a micro-droplet and dried to prepare an organic compound microparticle or a complex microparticle of an organic raw material and an inorganic substance. This organic compound microparticle or complex microparticle is thermally decomposed in a range of 300° C. to 1200° C. and left to cool to prepare a carbon microparticle. Here, if the reactivity of the product after thermal decomposition is high, the product is inactivated by being brought into contact with a gas having a low reactivity. In addition, if necessary, the product is washed with water or the like to remove inorganic substances and then dried. The carbon microparticles prepared in this way have a variety of sizes (diameters on the order of few nm to 50 μm) and morphologies. In addition, they are characterized by bulk densities of 3 to 300 g/L and a light weight.

In the following, the light weight carbon microparticle preparation method according to the present invention will be described using figures.

Example 1

Figure 1:
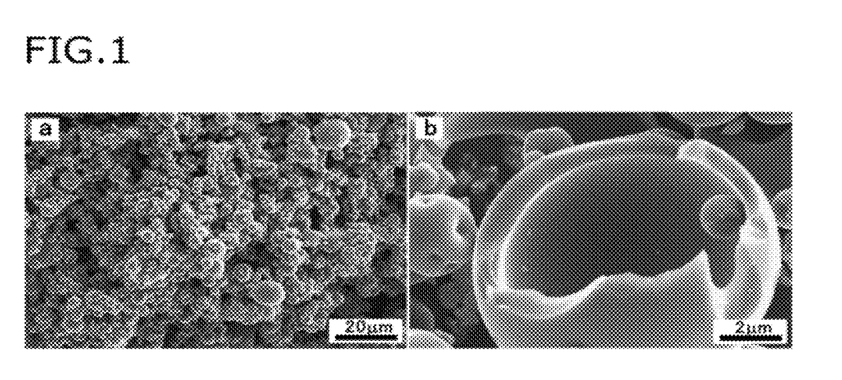

An aqueous solution with 5% total concentration of lignin sulfonic acid was spray-dried to prepare microparticles of lignin sulfonic acid. This was heat-processed under nitrogen atmosphere at 600° C. for one hour and let to cool to prepare hollow carbon microparticles such as those shown in FIGS. 1 (a) and (b). The hollow carbon microparticles had diameters on the order of few μm to 10 μm.

Example 2

Figure 2:
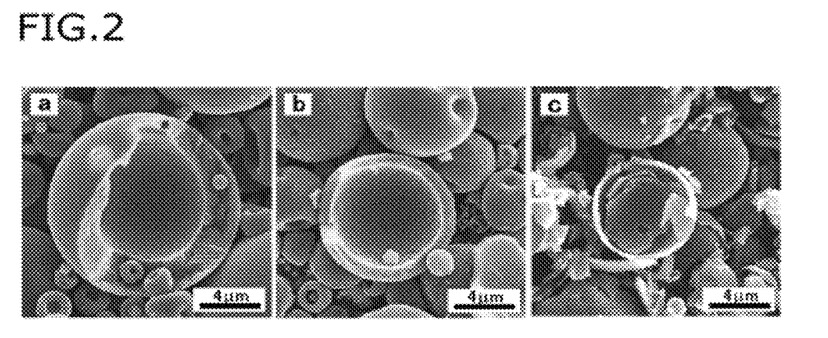

An aqueous solution with 5% total concentration of lignin and sodium hydroxide (proportion in mass was 1:0.25) was spray-dried to prepare complex microparticles. This was heat-processed under nitrogen atmosphere at 600° C. for one hour and let to cool. Thereafter, this was washed with water and further dried to prepare hollow carbon microparticles such as those shown in FIG. 2 (a). In addition, a similar process was performed on an aqueous solution with 1:0.5 as the proportion in mass of lignin and sodium hydroxide and 5% total concentration to prepare hollow carbon microparticles such as those shown in FIG. 2 (b). In addition, setting the proportion in mass of lignin and sodium hydroxide to 1:1, a similar process was performed on an aqueous solution with a total concentration of 5% to prepare hollow carbon microparticles such as those shown in FIG. 2 (c). The diameters of the hollow carbon microparticles in each of FIGS. 2 (a) to (c) were all on the order of few μm.

From FIG. 2 (a) to (c) it is possible to appreciate that when the proportion in mass of lignin and sodium hydroxide varies, the carbon wall thickness of the hollow carbon microparticle varies concomitantly. Concretely, the carbon wall thickness of the hollow carbon microparticle tended to be thin along with increasing amounts of sodium hydroxide added. That is to say, this result shows that the carbon wall thickness of the hollow carbon microparticle can be controlled by adjusting the proportion of sodium hydroxide added.

Example 3

Figure 3:
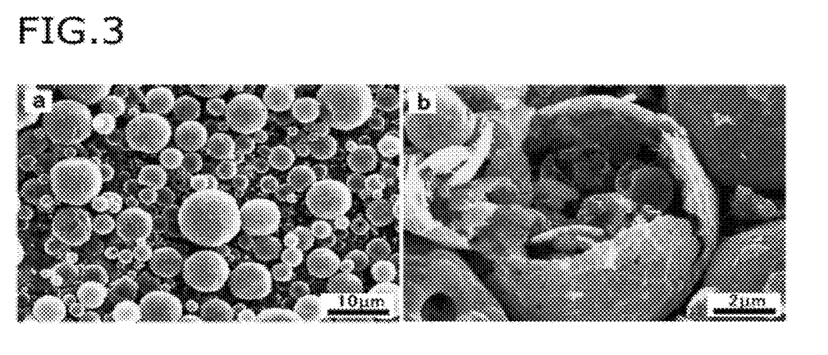

An aqueous solution with 5% total concentration of lignin, sodium hydroxide and sodium chloride (proportion in mass was 1:0.25:3) was spray-dried to prepare complex microparticles. This was heat-processed under nitrogen atmosphere at 600° C. for one hour and let to cool. Thereafter, this was washed with water and further dried to prepare hollow carbon microparticles such as those shown in FIG. 3. The diameter of this hollow carbon microparticle was on the order of few μm to 20 μm. In addition, the bulk density was approximately 30 g/L, which was extremely light.

Example 4

Figure 4:
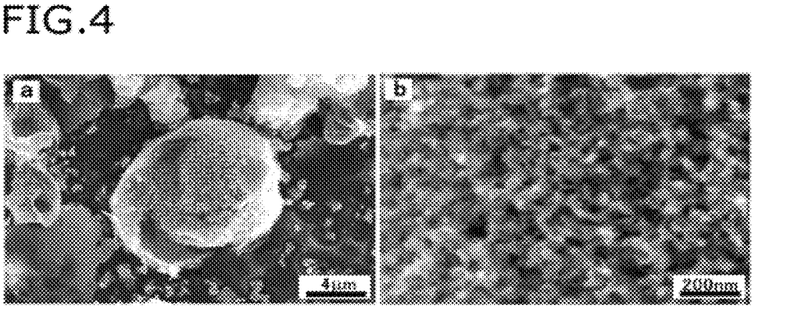

An aqueous solution with 5% total concentration of lignin, sodium hydroxide and sodium metasilicate (proportion in mass was 1:0.25:10) was spray-dried to prepare complex microparticles. This was heat-processed under nitrogen atmosphere at 600° C. for one hour and let to cool. Thereafter, this was washed with water and further dried to prepare carbon nanoparticles which diameters were few nm to few tens of nm, such as those shown in FIG. 4.

Example 5

An aqueous solution with 5% total concentration of lignin, sodium hydroxide, and graphite (proportion in mass was 1:0.5:0.15) was spray-dried to prepare complex microparticles. This was heat-processed under nitrogen atmosphere at 600° C. for one hour and let to cool. Thereafter, this was washed with water and further dried to verify that similar hollow carbon microparticles to FIG. 2 shown in Example 2 were prepared.

Note that regarding the Examples 2 to 5, in all cases of lignin samples, respectively, alkaline lignin, hydrolyzed lignin and lignin sulfonic acid, it could be verified that almost identical carbon microparticles could be prepared.

Example 6

Although large amounts of lignin are contained in a pulp waste solution generated when wood chips are processed in a pulp plant, currently, lignin from most of it is incinerated. If carbon microparticles could be prepared from this pulp waste solution, it would be a major contribution to the transition from fossil resources to biological resources and efficient utilization of resources.

However, there are many methods for preparing pulp, and the composition of each pulp waste solution generated in so doing is also different. When there are large amounts of lignin constituents in a pulp waste solution, it is possible to prepare carbon microparticles without performing preprocessing such as constituent separation; however, if a large amount of a constituent other than lignin is contained, preprocessing becomes necessary.

Figure 5:
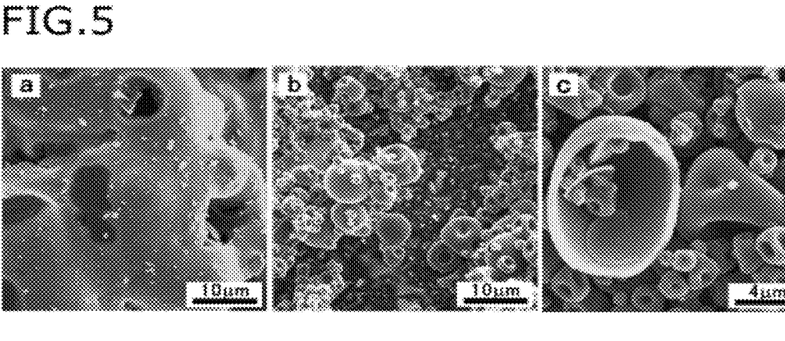

An actual pulp waste solution (total concentration: 23%) was simply diluted to prepare an aqueous solution with 5% total concentration. This aqueous solution was spray-dried to prepare microparticles. This was heat-processed under nitrogen atmosphere at 600° C. for one hour and let to cool, then, washed with water and further dried; the result was that the particles were fused to one another and no carbon microparticle could be obtained as shown in FIG. 5 (a). This is due to heat-melting of carbohydrate decomposition products or the like contained in the pulp waste solution in addition to lignin.

In order to prevent such melting, it is necessary to raise the constituent ratio of lignin. As methods therefor, a. precipitation-separation of lignin by absorption of acidic gas, b. precipitation-separation of lignin by addition of an inorganic acid, a multivalent cation, or an organic amine, c. decomposition-elimination by fermentation of sugar in pulp waste solution, d. separation-collection of high molecular weight lignin by ultrafiltration, and the like may be considered. It is believed that the constituent ratio of lignin can be raised by any methods.

In the present experiment, as one method with small environmental burden, d. separation-collection of high molecular weight lignin by ultrafiltration was performed, to examine the effect of ultrafiltration. Ten-fold diluted actual pulp waste solution was concentrated ten-fold using an ultrafiltration membrane with a cut-off molecular weight of 10,000. Then, the concentrated solution with a high molecular weight constituent as raw material was spray-dried to prepare microparticles. This was heat-processed under nitrogen atmosphere at 600° C. for one hour and let to cool, then washed with water, and dried further; the result was that hollow carbon microparticles such as those shown in FIGS. 5 (b) and (c) could be prepared. The diameter of this hollow carbon microparticle was on the order of few μm to 10 μm. From this, it was demonstrated that by raising the constituent ratio of lignin, carbon microparticles could be prepared also from raw materials containing various organic compounds and inorganic substances other than lignin, such as a pulp waste solution.

In addition, as a promising lignin separation method other than ultrafiltration, separation by absorption of carbon dioxide contained in the flue gas of paper manufacturing plants can be considered. In the experimental, as simulated flue gas, a nitrogen gas containing 20% carbon dioxide was flown into a pulp waste solution (pH 13.2) containing 12% solid content to lower the pH to 9.5, causing a portion of the organic constituent to precipitate. This precipitate was separated from the solution by centrifugal separation, washed and then dried. An aqueous solution comprising sodium metasilicate added with a proportion of 1:10 in mass ratio to this dry precipitate (5% total concentration) was spray-dried. This was heat-processed under nitrogen atmosphere at 600° C. for one hour and let to cool, then washed with water and further dried; the result was that a light-weight hollow carbon microparticle (carbon nanopipe cell described below) was obtained. From this, it was verified that a carbon microparticle could also be prepared using a constituent that precipitates by absorbing carbon dioxide gas to the pulp waste solution.

Example 7

As in the case of Example 2, an aqueous solution of lignin and alkali hydroxide or an aqueous solution of lignin and alkali carboxylate was spray-dried, to prepare a complex microparticle having a diameter on the order of few microns. This was heat-processed under nitrogen atmosphere at 600° C., let to cool to room temperature, then, when the product containing the generated carbon microparticles was taken out into the air, a phenomenon of strong heat generation was observed. Then, such heat generation was pronounced in the case where, lignin sulfonic acid was the raw material. The cause of the heat generation is due to the carbon microparticles and alkaline metals generated by the heat treatment react violently with oxygen or the like in the air.

Here, before the product was taken out into the air, by bringing it into contact with a gas having comparatively low reactivity such as nitrogen gas saturated with moisture, inactivation of the carbon microparticle surface was possible, and the rapid heat generation occurring when [the product is] taken out into the air could be controlled.

[Specific Surface Area of Carbon Microparticle]

It was verified that the specific surface area (surface area per unit mass) of a carbon microparticle when lignin alone was heat-processed at 600° C. as in the case shown in Example 1, was on the order of 180 to 430 m²/g. Meanwhile, it was found that the specific surface areas of the carbon microparticles in Example 2 (when the proportion in mass of lignin and sodium hydroxide was 1:0.5), 3 and 4 were respectively, 860 m²/g, 1280 m²/g and 900 m²/g, as shown in Table 1, and that all were equivalent to the specific surface area 910 m²/g of commercially available activated charcoal. From this, carbon microparticles prepared by adding a basic compound such as sodium hydroxide to lignin can also be considered as activated charcoal microparticles, and are suited to various applications.

TABLE 1

Surface area and pore capacity of carbon particles from the examples

|  | Surface area ($m^2g^{-1}$) | Micropore ($cm^3g^{-1}$) | Mesopore ($cm^3g^{-1}$) |
| --- | --- | --- | --- |
| Example 1 | 300 | 0.13 | 0.02 |
| Example 2b | 860 | 0.37 | 0.16 |
| Example 3 | 1280 | 0.45 | 1.30 |
| Example 4 | 900 | 0.23 | 1.46 |
| Example 6bc | 540 | 0.24 | 0.03 |
| Commercially available activated charcoal | 910 | 0.39 | 0.05 |

In the present invention, an organic compound microparticle or a complex microparticle of organic raw materials and inorganic substance is prepared by turning into micro-droplets and drying a solution of organic raw materials having lignin as a main constituent, which is a biological resource, as in Example 1, or a solution of a mixture of organic raw materials having lignin as a main constituent and an inorganic substance, as in Examples 2 to 7. Regarding this "solution", in addition to aqueous solutions, organic solutions containing an organic compound other than lignin, and furthermore, a suspension are included. In addition, as "inorganic substance", as indicated in Examples 3 to 5, mixtures of inorganic substances are included. Here, spray-drying is carried out in the examples as means for turning [a solution] into micro-droplets; however, without limiting to this, other means may be used, such as ultrasonic nebulization, as indicated in Example 8 described below.

In addition, carbon microparticles are prepared in the present invention by thermally decomposing organic compound microparticles or complex microparticles in a range of 300° C. to 1200° C. and letting to cool. Although the heat processing temperature was 600° C. in the examples, heat processing temperature in the present invention may be in the range of 300° C. to 1200° C. Here, drying of the microdroplets described above and thermal decomposition of microparticles may be carried out simultaneously inside the same reactor. In addition, when the reactivity of the product is high, the product is inactivated by being in contact with a "gas having low reactivity"; this gas is not limited to nitrogen gas pre-saturated with moisture as in Example 7, and may be an inert gas or the like with similarly adjusted moisture. This inactivation processing of the product may be carried out as necessary. In addition, washing and drying of the product after thermal decomposition may be carried out as necessary as well.

In prior art, carbon microparticles have been prepared with fossil resources such as oil as raw materials, at high temperatures of 1400° C. or higher. However, with the preparation method of the present invention, the fossil resource can be substituted with a biological resource such as a pulp waste solution containing lignin. In addition, since the preparation temperature is on the order of 300° C. to 1200° C. and can be lowered significantly compared to prior art technique, there is contribution to energy saving. In the future, as it is anticipated that, along with the promotion of the development of bioethanol, inexpensive lignin will be generated in large amounts, the present invention is expected to contribute to a decrease in costs and energy saving also from such a context.

Currently, carbon microparticles, of which carbon black is a representative, are used in majority as tire reinforcing agent. The carbon microparticle generated by the preparation method of the present invention is light weight, and some also exist with an equivalent specific surface area to commercially available activated charcoal, such that, in addition to utilization as rubber reinforcing agent such as for tires, utilization is anticipated as activated charcoal, controlled release material, black pigment, toner, color filter, conductive material, electrostatic prevention agent, battery electrode material, viscous fluid and the like.

Other Examples

Carbon microparticles suited to specific applications (respectively referred to as "carbon microcell", "carbon microballoon", "carbon nanopipe cell" and "carbon nanocell") were prepared by the preparation methods of Example 8 to 11 shown in the following.

Example 8

Carbon Microcell

Figure 6:
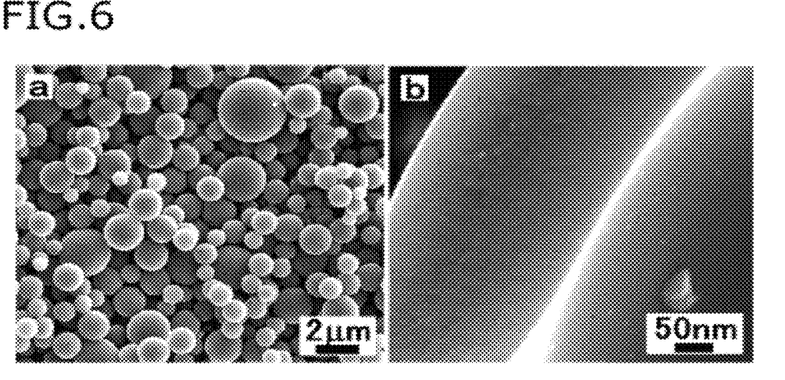

An aqueous solution with 5% total concentration of lignin sulfonic acid and sodium hydroxide (proportion in mass was 1:0.1) was ultrasonically nebulized and heated at 90° C. and dried to prepare lignin microparticles. This was heat-processed under nitrogen atmosphere at 600° C. for one hour and let to cool. Thereafter, this was washed with water and further dried to adjust carbon microcells such as those shown in FIG. 6 (a). The diameters of the microparticles shown in this figure were on the order of 0.2 to 3 μm. FIG. 6 (b) shows a portion of the fracture cross section of a microparticle thereof. It is clear with this photograph that these are hollow microparticles with a compact carbon structure and a carbon wall thickness of approximately 0.3 μm.

Since the carbon microcells prepared in this way have external diameters of 0.2 to 50 μm, carbon wall thicknesses of 0.05 to 20 μm, and a carbon wall with a compact structure, they are high strength, light weight hollow carbon materials. In contrast to prior art hollow carbon having numerous mesopores and macropores that provoke a decrease in strength, the carbon microcell of the present invention has a pore structure, which is a compact structure as shown in FIG. 6 (b) with micropores as the main body, thus has the characteristic of high physical strength.

The carbon microcell obtained in the present Example 8 is hollow carbon, and thus is light weight. Then, it has high strength, since the mesopores and the macropores, which are present in the carbon wall of prior art hollow carbon microparticle and provoke a decrease in strength, are almost inexistent. From this, [the microcell] can be used as a high strength, light weight filling material.

Example 9

Carbon Microballoon

Figure 7:
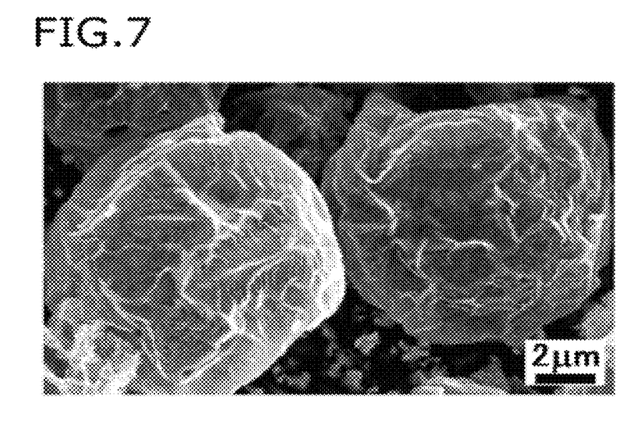
FIG. 7 is a photograph of carbon microballoons.

An aqueous solution with 5% total concentration of hydrolyzed lignin, sodium hydroxide and sodium chloride (the proportion in mass was 1:0.25:10) was spray-dried to prepare dried complex microparticles. This was heat-processed under nitrogen atmosphere at 800° C. for one hour and let to cool. Thereafter, this was washed with water and further dried to prepare carbon microballoons such as those shown in FIG. 7. The diameters of the microparticles shown in FIG. 7 were on the order of 2 to 15 μm and the bulk density was 12 g/L.

The carbon microballoon obtained in the present Example 9, is an ultra-light weight hollow carbon material having an external diameter of 0.2 to 50 μm, a carbon wall thickness of approximately 5 to 200 nm and a bulk density of 3 to 20 g/L. From this, [the microballoon] can be used as an ultra-light filling material.

Example 10

Carbon Nanopipe Cell

Figure 8:
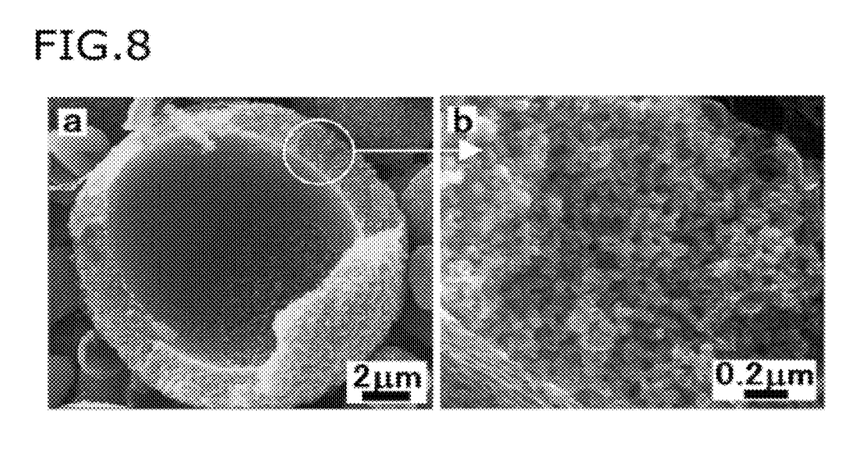

An aqueous solution with 5% total concentration of hydrolyzed lignin and sodium metasilicate (the proportion in mass was 1:3) was spray-dried to prepare dried complex microparticles. This was heat-processed under nitrogen atmosphere at 600° C. for one hour and let to cool. Thereafter, this was washed with water and further dried to prepare carbon nanopipe cells such as those shown in FIG. 8 (a). The diameters of the microparticles shown in FIG. 8 (a) were on the order of 2 to 15 µm.

From the structure shown in FIG. 8 (a), the carbon nanopipe cells obtained in the present example can be considered as one species of the carbon microcell obtained in Example 8. The external diameter of this carbon nanopipe cell was 0.2 to 50 µm, and the carbon wall thickness was 0.05 to 20 µm. Then, it can be considered to be a light-weight hollow carbon material with the carbon wall thereof having a special shape comprising a carbon nanopipe with irregularly curved and crossing structure, as shown in FIG. 8 (b), having an external diameter of 5 to 50 nm and a carbon wall thickness of 1 to 5 nm.

The carbon nanopipe cell obtained in the present example is a micron-size carbon microparticle, and at the same time, the carbon wall has a structure comprising a nanopipe with numerous voids, thus, the strength is low, which can be used as specially shaped light-weight filling materials, the particles disintegrating by mixing with a resin or rubber and being dispersed in the matrix at the nanopipe level. In addition, exploiting the fact that the carbon wall has a structure comprising a nanopipe with numerous voids, it can also be used as controlled-release materials for substances such as agricultural chemicals and medicinal drugs.

Example 11

Carbon Nanocell

An aqueous solution with 5% total concentration of hydrolyzed lignin and sodium orthosilicate (the proportion in mass was 1:10) was spray-dried to prepare dried complex microparticles. This was heat-processed under nitrogen atmosphere at 600° C. for one hour and let to cool. Thereafter, this was washed with water and further dried to prepare a carbon material in which the carbon wall of the carbon microparticle made of carbon nano microparticles (referred to as "carbon nanocell") as those shown in FIG. 9. The external diameter of this carbon nanocell shown in FIG. 9 was approximately 3 to 10 nm.

Figure 9:
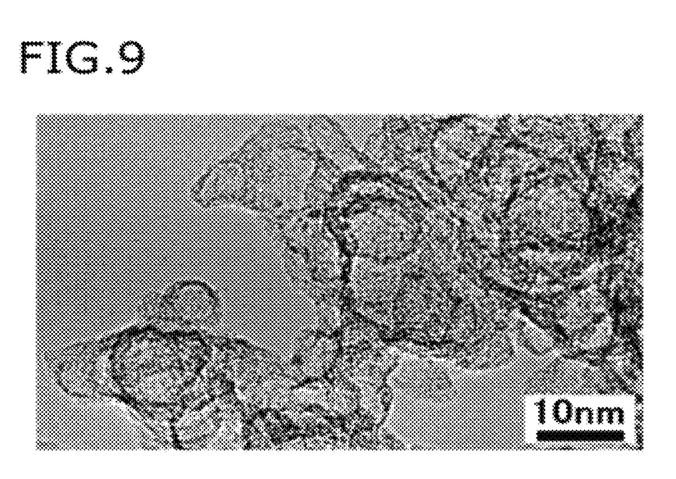
FIG. 9 is a photograph of carbon nanocells.

Since the carbon nanocell obtained in the present example has large voids within the particle, an external diameter of 3 to 30 nm and a carbon wall thickness of 1 to 5 nm, it can be considered to be an ultra-fine light-weight hollow carbon material. In addition, it has the characteristics of having irregular shape and being of non-graphite quality. Then, since the specific surface area is 1400 to 1600 m²/g, it has the characteristics of being ultra-fine and having a large specific surface area. That is to say, from the facts that the particle size is even smaller than prior art carbon black, and furthermore, improvement of reinforcement or the like can be expected with the addition of tiny amount, it can be used as an ultra-fine light-weight filler. In addition, from the fact that the specific surface area is extremely large, it can be used as an ultra-fine highly surface adsorbing material.

INDUSTRIAL APPLICABILITY

The carbon microparticles obtained by the preparation method of present invention being light-weight and some having an equivalent specific surface area to commercially available activated charcoal, in addition to uses as reinforcing agent for rubber such as of a tire, they can be used as activated charcoal, controlled release material, black pigment, toner, color filter, conductive material, electrostatic prevention agent, battery electrode material, viscous fluid and the like.

The invention claimed is:

1. A hollow carbon microparticle preparation method, comprising:
    providing an aqueous solution of an organic raw material having lignin as a main constituent;
    turning the aqueous solution into a micro-droplet;
    drying the micro-droplet to prepare a microparticle; and
    thermally decomposing the microparticle in a range of 300° C. to 1200° C. to prepare a hollow carbon microparticle.

2. A hollow carbon microparticle preparation method, comprising:
    providing a mixed aqueous solution of an organic raw material having lignin as a main constituent and an inorganic substance;
    turning the mixed aqueous solution into a micro-droplet;
    drying the micro-droplet to prepare a microparticle; and
    thermally decomposing the microparticle in a range of 300° C. to 1200° C. to prepare a hollow carbon microparticle.

3. The hollow carbon microparticle preparation method according to claim 2,
    wherein the inorganic substance is a metal compound constituted by one or more species selected from the group consisting of an oxide, a hydroxide, a carbonate and a halide of a metal, and
    wherein based on the property that a carbon wall thickness of the carbon microparticle becomes thinner as the proportion of the metal compound added increases, the proportion of the metal compound added is adjusted when preparing the mixed solution, so as to control the carbon wall thickness of the microparticle.

4. The hollow carbon microparticle preparation method according to claim 2, further comprising bringing the carbon microparticle obtained by the thermal decomposition into contact with a gas having lower reactivity to the surface of the carbon microparticle than the air, thereby inactivating the surface of the carbon microparticle by reaction with the gas and inhibiting a rapid heat generation occurring when the carbon microparticle is taken out into the air.

5. A hollow carbon microparticle preparation method, comprising:
    providing a mixed aqueous solution of an organic raw material having lignin as a main constituent and a basic compound selected from the group consisting of alkali hydroxide and alkali carboxylate;
    turning the mixed aqueous solution into a micro-droplet;
    drying the micro-droplet to prepare a microparticle; and
    thermally decomposing the microparticle in a range of 300° C. to 1200° C. to prepare a hollow carbon microparticle,
    wherein the specific surface area is increased to prepare a carbon microparticle.

6. A hollow carbon microparticle preparation method, comprising:
   preprocessing a pulp waste solution to raise a concentration of lignin included in the pulp waste solution, the pulp waste solution being aqueous,
   turning the pulp waste solution thus preprocessed into a micro-droplet;
   drying the micro-droplet to prepare a microparticle; and
   thermally decomposing the microparticle in a range of 300° C. to 1200° C. to prepare a hollow carbon microparticle.

7. A hollow carbon microparticle preparation method, comprising:
   preprocessing a pulp waste solution to raise a concentration of lignin included in the pulp waste solution, the pulp waste solution being aqueous;
   adding an inorganic substance to the pulp waste solution;
   turning the pulp waste solution into a micro-droplet;
   drying the micro-droplet to prepare a microparticle; and
   thermally decomposing the microparticle in a range of 300° C. to 1200° C. to prepare a carbon microparticle.

8. The hollow carbon microparticle preparation method according to claim 6, wherein the step of preprocessing includes carrying out separation-collection of lignin by ultrafiltration.

9. The hollow carbon microparticle preparation method according to claim 7, wherein the step of preprocessing includes carrying out separation-collection of high molecular weight lignin by ultrafiltration.

10. The hollow carbon microparticle preparation method according to claim 6, wherein the step of preprocessing includes absorbing carbon dioxide by the pulp waste solution to thereby decrease a hydrogen ion index and deposit a portion of an organic constituent, and removing the organic constituent from the pulp waste solution.

11. The hollow carbon microparticle preparation method according to claim 7, wherein the step of preprocessing includes absorbing carbon dioxide by the pulp waste solution to thereby decrease a hydrogen ion index and deposit a portion of an organic constituent, and removing the organic constituent from the pulp waste solution.

* * * * *